(12) United States Patent
Yach

(10) Patent No.: US 8,185,150 B2
(45) Date of Patent: *May 22, 2012

(54) METHODS AND APPARATUS FOR LINE SELECTION IN A COMMUNICATION DEVICE

(75) Inventor: David Yach, Waterloo (CA)

(73) Assignee: Research In Motion Limited, Waterloo, Ontario (CA)

( * ) Notice: Subject to any disclaimer, the term of this patent is extended or adjusted under 35 U.S.C. 154(b) by 639 days.

This patent is subject to a terminal disclaimer.

(21) Appl. No.: 12/040,045

(22) Filed: Feb. 29, 2008

(65) Prior Publication Data

US 2009/0221291 A1 Sep. 3, 2009

(51) Int. Cl.
*H04M 1/00* (2006.01)
(52) U.S. Cl. .................. 455/551; 455/552.1; 455/556.1
(58) Field of Classification Search ............... 455/552.1, 455/553.1, 435.2, 556.2, 556.1, 551; 379/156–166, 379/93.07, 93.09, 93.2, 93.24
See application file for complete search history.

(56) References Cited

U.S. PATENT DOCUMENTS

| | | | |
|---|---|---|---|
| 5,367,558 A | 11/1994 | Gillig et al. | |
| 5,428,666 A | 6/1995 | Fyfe et al. | |
| 5,448,622 A | 9/1995 | Huttunen | |
| 5,526,403 A | 6/1996 | Tam et al. | |
| 5,950,138 A | 9/1999 | Norimatsu | |
| 6,016,336 A | 1/2000 | Hanson | |
| 6,154,660 A | 11/2000 | Singh | |
| 6,178,335 B1 | 1/2001 | Vu | |
| 6,256,382 B1 | 7/2001 | Toda | |
| 7,231,229 B1 | 6/2007 | Hawkins et al. | |
| 7,715,535 B2 | 5/2010 | Vander Veen et al. | |
| 2002/0001378 A1 | 1/2002 | Ooi | |
| 2002/0128036 A1* | 9/2002 | Yach et al. | ............ 455/552 |
| 2004/0077352 A1 | 4/2004 | Mahany | |
| 2004/0258231 A1 | 12/2004 | Elsey et al. | |
| 2005/0170854 A1 | 8/2005 | Benco et al. | |
| 2006/0095857 A1* | 5/2006 | Torvinen | ............ 715/764 |
| 2007/0047695 A1 | 3/2007 | Tal et al. | |
| 2007/0081641 A1 | 4/2007 | Veen et al. | |

(Continued)

FOREIGN PATENT DOCUMENTS

CA 2654356 8/2009

(Continued)

OTHER PUBLICATIONS

European Search and Examination Report. Application No. 08152122.1. Dated: Sep. 4, 2008.

(Continued)

*Primary Examiner* — Lester Kincaid
*Assistant Examiner* — Daniel Lai
(74) *Attorney, Agent, or Firm* — Bereskin & Parr LLP/S.E.N.C.R.L., s.r.l.

(57) ABSTRACT

Embodiments of an apparatus and methods for selecting a communication line from two or more lines on a communication device are described herein. The communication device comprises a display module, an input module, a line selection module, and a communication module for making a call over a network to a target recipient. In one broad aspect, a determination of which of the communication lines is the communication line associated with the selected one of at least two appointment categories for an appointment is made in the selection of a communication line accessible at the communication device on which an outgoing call may be placed.

20 Claims, 14 Drawing Sheets

U.S. PATENT DOCUMENTS

| | | | |
|---|---|---|---|
| 2007/0129103 | A1 | 6/2007 | Al-Shaikh |
| 2007/0165798 | A1* | 7/2007 | Maehara .................... 379/88.21 |
| 2007/0191060 | A1 | 8/2007 | Baek |
| 2007/0206762 | A1 | 9/2007 | Chandra et al. |
| 2008/0255977 | A1 | 10/2008 | Altberg et al. |
| 2008/0280639 | A1* | 11/2008 | Alfia ............................. 455/551 |
| 2009/0029685 | A1 | 1/2009 | Willis |
| 2009/0221268 | A1 | 9/2009 | Yach |
| 2009/0221322 | A1 | 9/2009 | Yach |
| 2009/0221323 | A1 | 9/2009 | Yach |
| 2010/0159901 | A1 | 6/2010 | Vander Veen et al. |

FOREIGN PATENT DOCUMENTS

| | | |
|---|---|---|
| CA | 2654536 | 8/2009 |
| CA | 2654537 | 8/2009 |
| CA | 2654548 | 8/2009 |
| EP | 1225505 | 7/2002 |
| EP | 1768360 | 3/2007 |
| EP | 1804473 | 7/2007 |
| EP | 2096842 | 9/2009 |
| EP | 2096847 | 9/2009 |
| EP | 2096885 | 9/2009 |
| EP | 2104396 | 9/2009 |
| WO | 2006/082506 | 8/2006 |

OTHER PUBLICATIONS

European Examination Report. Application No. 08152122.1. Dated: Jul. 7, 2009.
European Search and Examination Report. Application No. 08152124.7. Dated: Sep. 15, 2008.
European Examination Report. Application No. 08152124.7. Dated: Sep. 30, 2009.
European Search and Examination Report. Application No. 08152125.4. Dated: Oct. 17, 2008.
European Examination Report. Application No. 08152125.4. Dated: May 29, 2009.
European Search and Examination Report. Application No. 08152126.2. Dated: Sep. 23, 2008.
Co-pending U.S. Appl. No. 11/235,509, "Method and Apparatus for Line Selection in a Communication Device", filed Sep. 27, 2005.
Co-pending U.S. Appl. No. 12/040,039, "Methods and Apparatus for Line Selection in a Communication Device", filed Feb. 29, 2008.
Co-pending U.S. Appl. No. 12/040,025, "Methods and Apparatus for Line Selection in a Communication Device", filed Feb. 29, 2008.
Co-pending U.S. Appl. No. 12/040,057, "Methods and Apparatus for Line Selection in a Communication Device", filed Feb. 29, 2008.
Office Action. Co-pending U.S. Appl. No. 12/040,039. Dated: Oct. 14, 2010.
Office Action. Co-pending U.S. Appl. No. 12/040,025. Dated: Oct. 14, 2010.
Office Action. Co-pending U.S. Appl. No. 12/040,057. Dated: Oct. 14, 2010.
Summons to Attend Oral Proceedings Pursuant to Rule 115(1) EPC. European Application No. 08152122.1. Dated: May 7, 2010.
Summons to Attend Oral Proceedings Pursuant to Rule 115(1) EPC. European Application No. 08152122.1. Dated: Dec. 1, 2010.
Communication Under Rule 71(3) EPC. European Application No. 08152124.7. Dated Jun. 16, 2010.
Decision to Grant a European Patent Pursuant to Article 97(1) EPC. European Application No. 081552125.4. Dated: Aug. 26, 2010.
Communication Pursuant to Article 94(3) EPC. European Patent Application No. 08152126.2. Dated Jul. 1, 2010.
Co-pending U.S. Appl. No. 12/718,070, "Method and Apparatus for Line Selection in a Communication Device", filed Mar. 5, 2010.
Brief Communication. European Application No. 08152122.1. Dated: Oct. 28, 2010.
Office Action Response. Co-pending U.S. Appl. No. 12/040,057. Dated: Jan. 14, 2011.
Office Action Response. Co-pending U.S. Appl. No. 12/040,025. Dated: Jan. 14, 2011.
Office Action Response. Co-pending U.S. Appl. No. 12/040,039. Dated: Jan. 14, 2011.
Final Office Action. Co-pending U.S. Appl. No. 12/040,025. Dated: Apr. 4, 2011.
Response with RCE. Co-pending U.S. Appl. No. 12/040,025. Dated: Jun. 1, 2011.
Communication Under Rule 71(3) EPC. European Patent Application No. 08152122.1. Dated: May 5, 2011.
Final Office Action. Co-pending U.S. Appl. No. 12/040,039. Dated: Apr. 5, 2011.
Response with RCE. Co-pending U.S. Appl. No. 12/040,039. Dated: Jun. 1, 2011.
Final Office Action. Co-pending U.S. Appl. No. 12/040,057. Dated: Apr. 1, 2011.
Response with RCE. Co-pending U.S. Appl. No. 12/040,057. Dated: Jun. 1, 2011.
Office Action. Canadian Patent Application No. 2,654,356. Dated: Apr. 1, 2011.
Office Action. Canadian Patent Application No. 2,654,536. Dated: Apr. 1, 2011.
Office Action. Canadian Patent Application No. 2,654,537. Dated: Apr. 8, 2011.
Office Action. Canadian Patent Application No. 2,654,548. Dated: Apr. 1, 2011.
"Nextel Alternate Line Service FAQs" prior to Feb. 9, 2005.
Office Action. Co-pending U.S. Appl. No. 12/040,025. Dated: Jun. 27, 2011.
Response. Co-pending U.S. Appl. No. 12/040,025. Dated: Sep. 14, 2011.
Office Action. Co-pending U.S. Appl. No. 12/040,039. Dated: Jun. 27, 2011.
Response. Co-pending U.S. Appl. No. 12/040,039. Dated: Sep. 14, 2011.
Communication Under Rule 71(3) EPC. European Patent Application No. 08152125.4. Dated: Apr. 12, 2010.
Final Office Action. Co-pending U.S. Appl. No. 12/040,025. Dated: Dec. 30, 2011.
Decision to grant a European patent pursuant to Article 97(1) EPC. European Patent Application No. 08152122.1. Dated: Sep. 22, 2011.
Final Office Action. Co-pending U.S. Appl. No. 12/040,039. Dated Nov. 9, 2011.
Amendment. Co-pending U.S. Appl. No. 12/040,039. Dated: Jan. 9, 2012.
Request for Continued Examination (RCE). Co-pending U.S. Appl. No. 12/040,039. Dated: Jan. 9, 2012.
Decision to grant a European patent pursuant to Article 97(1) EPC. European Patent Application No. 08152124.7. Dated: Dec. 9, 2010.
Office Action. Co-pending U.S. Appl. No. 12/040,057. Dated: Sep. 30, 2011.
Amendment. Co-pending U.S. Appl. No. 12/040,057. Dated: Dec. 30, 2011.
Office Action. Co-pending U.S. Appl. No. 12/718,070. Dated: Oct. 28, 2011.
Final Office Action. Co-pending U.S. Appl. No. 12/040,057. Dated: Mar. 19, 2012.
Amendment and Request for Continued Examination (RCE). Co-pending U.S. Appl. No. 12/040,025. Dated: Mar. 1, 2012.

* cited by examiner

METHODS AND APPARATUS FOR LINE SELECTION IN A COMMUNICATION DEVICE

TECHNICAL FIELD

Embodiments described herein relate to communications devices, and more specifically to mobile devices that allow outgoing calls to be made by a user on a communication line selected from a plurality of communication lines.

BACKGROUND

Communications devices with the ability to consolidate multiple functions into a single device are becoming increasingly popular. For example, such a communications device may be used as a telephone and for e-mail. In addition, it is common for an individual to use such a communications device for many aspects of their lives such as work and personal use.

A user may wish to use a different phone line when making calls to different parties. For example, when calling a work colleague, a user may wish to use a line dedicated for work use so that, when the work colleague receives the call on their communications device, the user's work phone number is identified. Likewise, when calling a friend, the user may wish to use a line for personal use so that, when the friend receives the call on their communications device, the user's personal phone number is identified. The use of multiple lines may also be useful for tracking long distance bills and other billing matters.

Systems for selecting alternate lines exist and are commonly known as "Alternate Line Service" (ALS). In one known system, when a user wishes to make a call on an alternate line, they must open a menu and manually select the alternate line. Due to the added operating steps and time it would take to configure the call, it is not convenient to use an alternate line. In addition, the user may accidentally make a call on the wrong line by forgetting to select an alternate line or by selecting the wrong line.

BRIEF DESCRIPTION OF THE DRAWINGS

For a better understanding of embodiments described herein, and to show more clearly how they may be carried into effect, reference will now be made, by way of example, to the accompanying drawings in which.

DETAILED DESCRIPTION OF THE EMBODIMENTS

In one broad aspect, there is provided a method of placing a call on a communication line selected from at least two communication lines on which outgoing calls are placed using a mobile device, said method comprising: identifying an appointment record comprising data identifying a target recipient, wherein the appointment record is associated with a selected one of at least two appointment categories, and wherein one of the at least two communication lines is associated with the selected one of the at least two appointment categories; monitoring for initiation of a call to the target recipient; upon detecting the initiation of the call to the target recipient, determining which of the at least two communication lines is the communication line associated with the selected one of the at least two appointment categories; and placing the call to the target recipient on the determined communication line of the at least two communication lines which is the communication line associated with the selected one of the at least two appointment categories.

Figure 1:
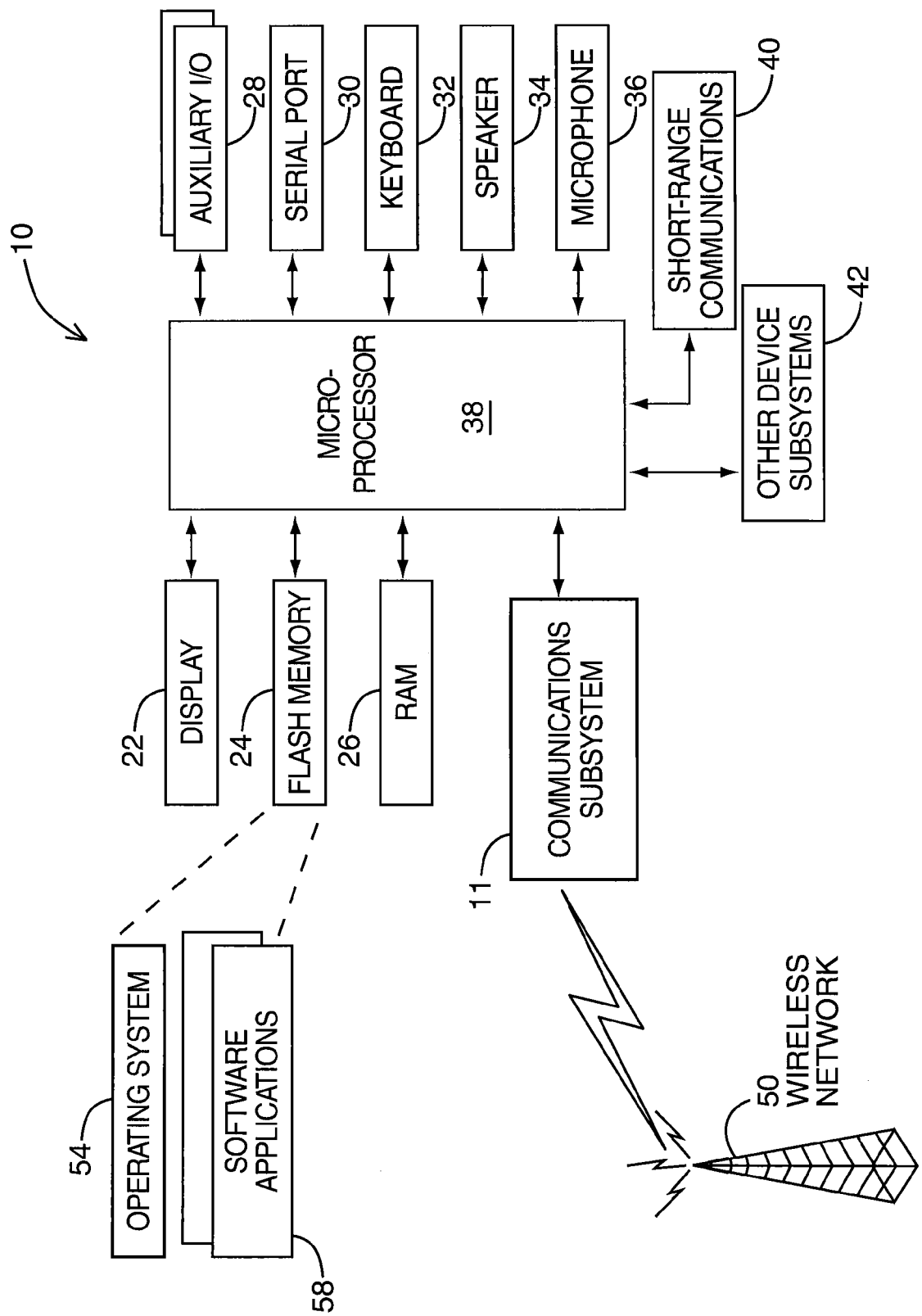
FIG. 1 shows in block diagram form a mobile communications device incorporating a line selection mechanism in accordance with an embodiment of the present invention.

Referring now to the drawings, FIG. 1 is a block diagram showing an example of an electronic communications device 10 suitable for use with a line selection mechanism in accordance with embodiments described herein. The communication device 10 generally comprises a two-way mobile communication device having voice and messaging communications capabilities. The electronic communication device 10 may take various forms or implementations such as, but not limited to, a data communication device, a multiple-mode communication device configured for both data and voice communications, a mobile telephone, a personal digital assistant (PDA) enabled for wireless communication, a computer system with a wireless modem or wireless network card, or a computer or phone device with a fixed connection to a network. The device 10 may also be implemented as a handheld or portable device.

As shown in FIG. 1, the communication device 10 includes a communication subsystem 11. The communication subsystem 11 may comprise a receiver (not shown), a transmitter (not shown), and associated components such as an antenna element (not shown), and a controller such as a digital signal processor (DSP). As will be apparent to those skilled in the art, the particular design of the communication subsystem 11 may depend on the communication network(s) in which the device 10 is intended to operate.

Signals received by the communication device 10 from a wireless communication network 50 are input to the receiver (not shown) of the communication subsystem 11, which may perform such common receiver functions such as, without limitation, signal amplification, frequency-down conversion, filtering, channel selection and the like. In a similar manner, signals to be transmitted may be processed by the DSP adapted to perform, for example, modulation and encoding and input to the transmitter for digital-to-analog conversion, frequency-up conversion, filtering, amplification and transmission over the wireless communication network 50.

Figure 2:
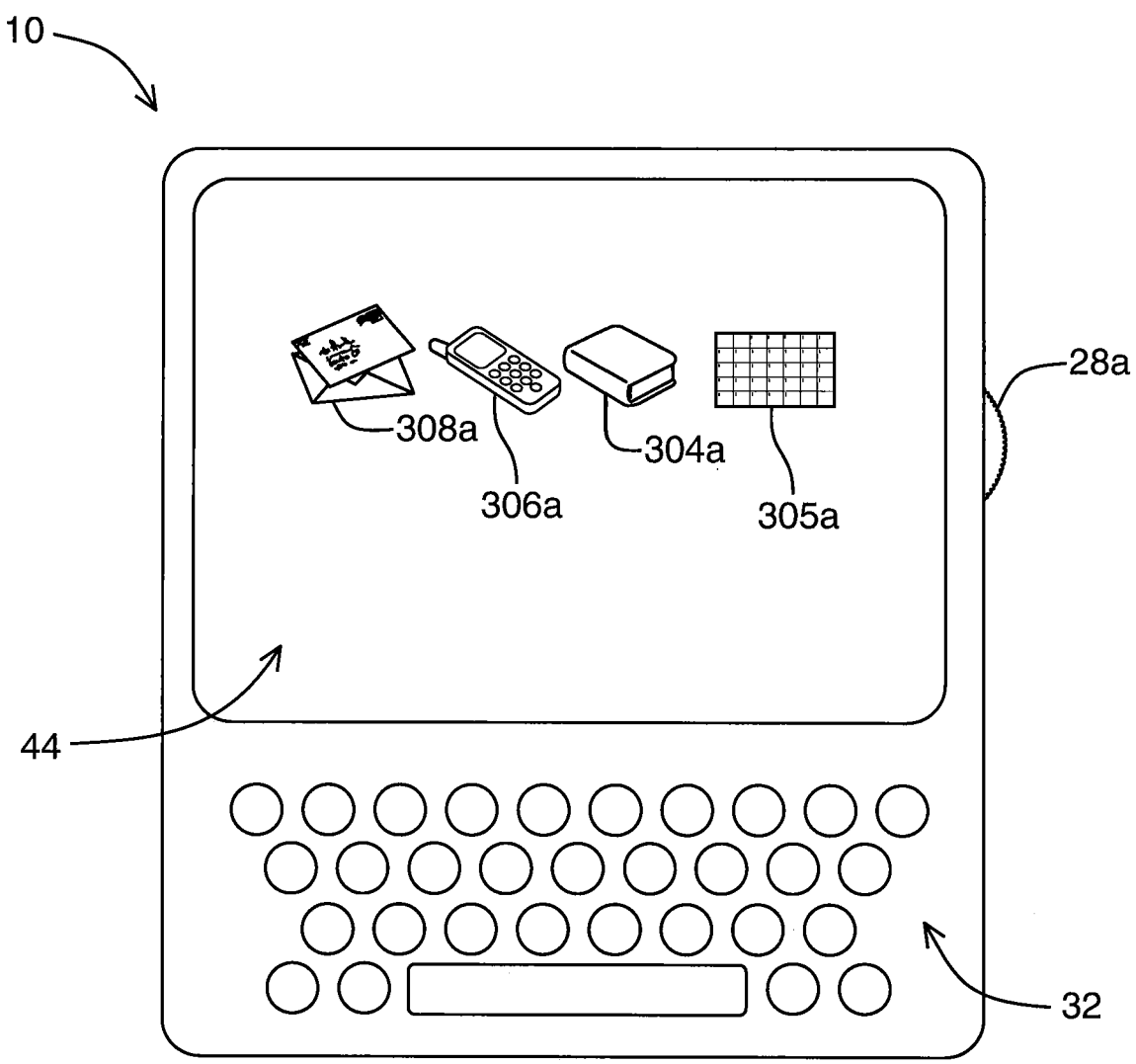
FIG. 2 shows, in diagrammatic form, a front view of an exemplary implementation of the mobile communications device of FIG. 1.

The communication device 10 includes a microprocessor or microcontroller device 38. The microprocessor operates under stored program control (e.g. firmware) and is suitably programmed to control the overall operation of the communication device 10 and other functions as described below. The microprocessor 38 may interact with the communications subsystem 11 and may also interact with further device subsystems such as, without limitation: a display module 22, a flash memory 24, a random access memory (RAM) 26, one or more auxiliary input/output (I/O) subsystems or devices 28 (e.g. a thumbwheel 28a as shown in FIG. 2, or a trackball), a serial port 30, an input device e.g. a keyboard or keypad 32, a speaker 34, a microphone 36, a short-range communications subsystem 40, and other device subsystems or modules which are generally designated by reference 42.

Referring back to FIG. 1, the microprocessor 38, in addition to its operating system functions, may enable execution of the software applications 58 on the device. The software applications 58 may control basic device operations, including data and voice communication applications for example, and may be installed (e.g. "burned") in the device 10 as firmware during manufacture. Further software applications may also be loaded onto the device 10 through the wireless communication network 50, an auxiliary I/O subsystem or module 28, serial port 30, short-range communications subsystem 40 or any other suitable subsystem 42, and may be installed by a user (or automatically) in the RAM 26 or a non-volatile memory device for execution by the microprocessor 38. Such flexibility in application installation may increase the functionality of the device 10 and may provide enhanced on-device functions, communication-related functions, or both. For example, secure communication applications may enable electronic commerce functions and other such financial transactions to be performed using the device 10.

In data communication mode, a received signal such as a text message or web page download is processed by the communication subsystem 11 and input to the microprocessor 38, which may further process the received signal for output to the display 22 through a graphics module, for example in the subsystem 42, or alternatively to an auxiliary I/O device 28. A user of the communication device 10 may also compose data items within a software application 58, such as e-mail messages and phone numbers for example, using the keyboard 32 in conjunction with the display 22 and for the auxiliary I/O device 28 (e.g. the thumbwheel 28a). Such composed items may then be transmitted and received over a communication network (e.g. the wireless network 50) through the communication subsystem 11.

The serial port 30 (which may be for example a universal serial bus (USB) port) in FIG. 1 allows a user to set preferences through an external device or software application. This may extend the capabilities of the device 10 by providing for information or software downloads to the device 10 other than through the wireless communication network 50.

The short-range communication subsystem 40 provides for communication between the device 10 and different systems or devices, which need not necessarily be similar devices. For example, the short-range communication subsystem 40 may comprise an infrared device and associated circuits and components, or a Bluetooth™ communication module, to provide for communication with similarly enabled systems and devices.

The wireless communication network 50 may comprise a wireless wide area packet data network, (e.g. Mobitex™ or DataTAC™), which provides radio coverage to mobile implementations of the device 10. The wireless communication network 50 may comprise a voice and data network such as GSM (Global System for Mobile Communication) and GPRS (General Packet Radio System), CDMA (Code Division Multiple Access), EV-DO (Evolution-Data Optimized), EVDO (Evolution-Data only) or various other third generation networks such as EDGE (Enhanced Data rates for GSM Evolution), UMTS (Universal Mobile Telecommunications Systems), or HSDPA (High Speed Downlink Packet Access), for example. In another implementation or embodiment, the wireless communication network 50 comprises a wireless local area network (WLAN), such as a network according to one of the IEEE 802.11 family of standards. In another implementation or embodiment, the communication device 10 is configured to communicate in both data and voice modes over both wireless WAN and WLAN networks and to roam between such networks.

Stored program control may include operating system software 54 and other software applications or functions 58 used by the microprocessor 38. The program (i.e. firmware) may be stored in a persistent (i.e. non-volatile) device such as flash memory 24 or on another storage device. Those skilled in the art will appreciate that the operating system 54, the software applications 58, or parts thereof, may be temporarily loaded into a volatile store such as RAM 26. It is contemplated that received communication signals may also be stored to RAM 26.

Reference is next made to FIG. 2, which shows, in diagrammatic form, a front view of one embodiment of the communication device 10 implemented as a handheld unit and indicated generally by reference 20. The handheld device 20 includes a display screen 44, an alphanumeric keyboard or keypad 32 and the thumbwheel 28a.

Figure 3:
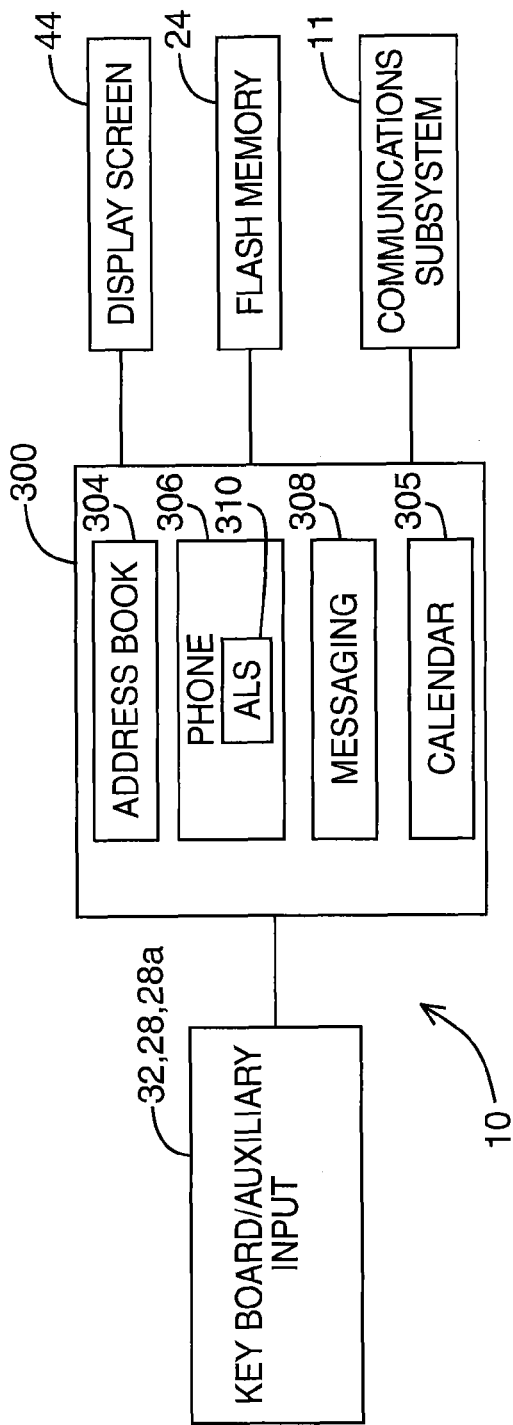
FIG. 3 shows in block diagram form further aspects of the mobile communications device of FIG. 1.

Reference is next made to FIG. 3, which depicts the software application 58 (FIG. 1) resident (i.e. loaded or stored) on the device 10 and implemented as functional components or modules 300. The functional components or modules 300 interact and control the device subsystems described above, and may comprise, for example, an address book module 304, a calendar module 305, a communication module 306, and an e-mail and/or instant messaging module 308. Although the communication module 306 is described and shown herein primarily as a phone communication module 306, it will be appreciated that in other embodiments the communication module may comprise a data communication device or voice/data communication device. The features/operations associated with the functional modules 300 may be implemented through firmware or hardware components, or a combination of hardware and firmware executed by the microprocessor 38.

Although not explicitly shown in FIG. 3, modules 300 may comprise one or more input modules that processes inputs received from the user through one or more input devices (e.g. through keyboard or auxiliary inputs 28, 28a, 32) for use by other modules 300. Similarly, modules 300 may comprise one or more output modules (e.g. a display module) that process output to be presented (e.g. displayed in display screen 44) to users. It will be appreciated that some or all of the functionality of such one or more input and/or output modules may be provided by one or more other modules 300.

The address book module 304 provides the functionality to store and access contact information, such as telephone numbers and e-mail and/or instant text messaging addresses, as well as information such as a contact's name, company name, address, notes about the contact and contact category (e.g. work, personal, etc). The calendar module 305 provides the functionality to store and access appointment records, which may comprising data such as, without limitation: date, start time, end time, time zone data, duration, location, description, recurrence interval data, and reminder setting data, as well as information that identifies an associated appointment category from a plurality of appointment categories (e.g. work, personal, etc). The phone module 306 allows the device 10 to operate as a voice phone (or a video phone in another implementation) over the wireless network 50 and/or other networks. The messaging module 308 provides the communication device 10 with the capability to send and receive electronic messages such as e-mail and/or text messages over the wireless network 50 and/or other networks.

As shown in FIG. 2, the functional modules 300 may each have an associated selectable icon that is displayed on the screen 44 as part of a graphical user interface. As shown, the address book module 304 may be identified by an associated icon 304a. The calendar module 305 may be identified by an associated icon 305a. The phone module 306 may be identified by an associated icon 306a and the electronic messaging module 308 may be identified by an associated icon 308a.

In at least one example embodiment, the phone module 306 is configured to access at least a first communication line and a second communication line for transmitting outgoing calls and receiving incoming calls. Accordingly, the communication device 10 may have associated therewith at least a first and a second call number (e.g. phone number) corresponding to the first line and to the second line respectively. For example, a user may use a first communication line having a corresponding first phone number for work use, and a second communication line having a corresponding second phone number for personal use.

A communication line may generally comprise a line on which phone calls may be made and/or received. Typically, the line will be capable of supporting voice communications. However, lines that are capable of supporting only non-voice data communications or lines that are capable of supporting both voice and non-voice data communications may also be a communication line accessible at the communication device 10. For example, lines supporting Voice over IP (VoIP) communications, video phone lines, and lines that might only support SMS or instant message communications may be provided as communication lines.

As shown in FIG. 3, the communication device 10 comprises a line selection module 310 for selecting which communication line should be used by the phone module 306 to, for example, place an outgoing call to a target recipient. In some embodiments, line selection module 310 may select the communication line to be used based upon line selection information stored on the device 10. The line selection information may comprise, for example, a record of which line is a default line.

When the user initiates a phone call to a target recipient, the microprocessor 38 under program control determines the selected communication line for the line selection module 310, and passes it on to the phone module 306. It should be noted that the functions of line selection module 310 may be implemented in a component or function of the phone module 306. The functions of line selection module 310 may be implemented in some other module, for example, the address book module 304.

According to one implementation, when a user makes a phone call, the line selection module 310 selects a default line. This default line may be pre-selected by the user, for example by way of a line selection user interface screen as will be described in more detail below. The default line may be the first communication line, the second communication line or any other communication line.

The line that is used for a call to a particular target recipient may be recorded by the microprocessor 38 in association with that target recipient so that the next time a call is made to that target recipient, the line selection module 310 selects the recorded line. It should be noted that the term "target recipient" is referred to herein as the phone number, person, company or the like to whom/which an outgoing call is made. The term "target recipient" may also be taken to mean one or more persons, companies or the like.

In at least one example embodiment, the frequency with which a communication line is used may also be recorded by the microprocessor 38 and used by line selection module 310 to select a communication line on which an outgoing call to a target recipient may be placed. In one embodiment, the communication line most frequency used on the device 10 may be selected, to be calculated based on outgoing calls that have previously been placed from the device 10. The calculation may be made based on outgoing calls placed on a particular communication line during some pre-defined period of time. For example, the communication line that has been used most frequently for placing outgoing calls in the last seven days may be the line selected for the next outgoing call, unless the user specifically requests the use of a different communication line. When an outgoing call is made, line selection information comprising line selection data identifying the communication line on which the outgoing call is made may be stored, so that it may be used in at least one subsequent determination of which communication line is the most frequently used one on device 10. In the above-described embodiments, the communication line most frequently used thus far on the device 10 is selected without regard to the individual or entity being called; however, in variant embodiments, the communication line most frequently used to call a specific target recipient may be determined. According to at least one other example embodiment, the communication line determined to be the most frequently used communication line on the device may be calculated based additionally, or alternatively, on incoming calls that have previously been received at the device 10.

According to another example embodiment, target recipients for which data is stored as entries in the address book of the address book module 304 are each associated with a particular line. When a call is placed to a particular target recipient, the line selection module 310 selects the communication line associated with that particular target recipient.

According to at least other example embodiment, messaging module 308 (FIG. 3) may be configured to receive messages (e.g. e-mail messages, instant messages, SMS messages) at any of two or more message addresses (e.g. e-mail addresses, SMS addresses which may be a phone number, instant message addresses). For instance, messaging module 308 (FIG. 3) may be configured to receive e-mail messages addressed to a user's business e-mail address as well as to receive e-mail messages directed to a user's personal e-mail address.

Some messages may contain certain data that identifies a potential target recipient for a call. For instance, an e-mail message may contain text that identifies a particular individual, which may or may not be the message sender, by name, phone number and/or an e-mail address, for example. The messaging module 308 may provide a user interface in which users of the device 10 may review the text of messages. The user interface may be configured to highlight, for example, the name or phone number of the individual displayed in the message text as a user-selectable link. In use, when the link is selected, an instruction may be sent to the phone module 306 to initiate a call to the individual associated with the selected item. It may be necessary to associate a selected name (or selected e-mail address for example) to a phone number for the individual (i.e. the target recipient of the call to be placed) using data contained in an address book, which is managed by the address book module 304 for example, prior to initiating the call.

When a call to a target recipient is initiated upon selection of data identifying the target recipient in the message, the line selection module 310 may determine the communication line to be used to place the call as a communication line that is associated with the message address at which the message was received. For example, a business e-mail address may be associated with a business line such that when a target recipient is identified in the text of an e-mail message received at the business e-mail address and a call to that target recipient is initiated, the line selection module 310 may select the associated communication line identified by the user as the "business" line for placing the call. Line selection information comprising data identifying, for each of two or more message addresses, which communication line of at least two communication lines accessible at device 10 is associated therewith, is stored on device 10 for use, for example, by line selection module 310.

According to at least one other example embodiment, appointment records are stored on device 10 and managed by the calendar module 305. An appointment record may be associated with one of at least two appointment categories (e.g. business, personal, etc). The appointment category to be associated with a particular appointment record may be one that is selected by the user when the appointment record is first created, for example. A default category may also be associated with appointment records. The appointment category associated with a particular appointment record may also be modified (e.g. by a user or administrator) from time to time.

Some appointment records may contain data that identifies a potential target recipient for a call. For instance, an appointment record may contain data that identifies a particular individual, such as the name of a person with whom the user of device 10 has an appointment. This data may comprise a name, phone number and/or an e-mail address of the individual, for example. The calendar module 305 may provide a user interface in which users of the device 10 may review details of their appointments. The user interface may be configured to highlight, for example, the name or phone number of an individual identified in the displayed appointment record as a user-selectable link. When the link is selected, an instruction may be sent to the phone module 306 to initiate a call to the individual associated with the selected item. It may be necessary to associate a selected name (or selected e-mail address for example) to a phone number for the individual (i.e. the target recipient of the call to be placed) using data contained in an address book, which is managed by the address book module 304 for example, prior to initiating the call.

When a call to a target recipient is initiated upon selection of the data identifying the target recipient in the appointment record, the line selection module 310 may determine the communication line to be used to place the call as a communication line that is associated with the appointment category associated with the appointment record. For example, a business appointment category may be associated with a business line such that when a target recipient is identified in the data of an appointment record associated with that business appointment category and a call to that target recipient is initiated, the line selection module 310 may select the associated communication line identified by the user as the "business" line for placing the call. Line selection information comprising data identifying, for each of the at least two appointment categories, which communication line of the at least two communication lines accessible at device 10 is associated therewith, is stored on device 10 for use, for example, by line selection module 310.

Figure 4A:
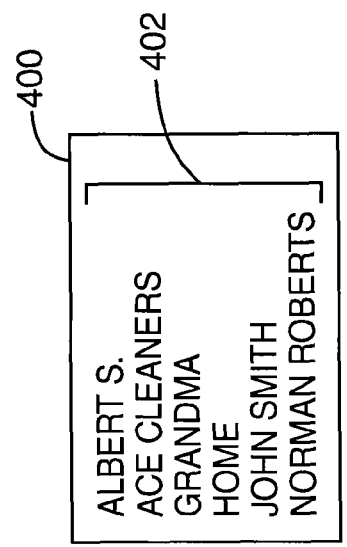
FIG. 4A shows in diagrammatic form an example of a graphical user interface screen for an address book for the device.

Reference is next made to FIG. 4A, which shows, in diagrammatic form, an example of a graphical user interface screen (e.g. display screen) for an address book list 400. The address book list screen 400 may be generated in response to the user selecting the address book icon 304a (FIG. 2), for example using the thumbwheel 28a (FIG. 2). The address book list screen 400 includes a list of target recipients denoted by reference 402. The address book entry screen 400 may also be generated in response to the user selecting the phone module icon 306a (FIG. 2) and subsequent selection of a menu item.

Figure 4B:
FIG. 4B shows in diagrammatic form an address book entry for the graphical user interface screen.

Selection of a particular target recipient from the list of target recipients 402, via the keyboard 32 and/or an auxiliary input device 28 such as thumbwheel 28a, generates an address book entry graphical user interface or display screen 404, as shown in the example screen illustrated by FIG. 4B. As shown in the example screen, the address book entry display screen 404 includes one or more of the following: a name 406 for the target recipient (e.g. John Smith), a company name 408 with which the target recipient is associated (e.g. John Smith Company), a phone number 410 for the target recipient phone number (e.g. (123) 456-7890), an e-mail address 412 associated with the target recipient (e.g. john.smith@smithco.com) and notes 414 associated with the target recipient.

Figure 4C:
FIG. 4C shows a further view of the address book entry on the graphical user interface screen.

According to another example embodiment, the address book entry screen 404 includes a user selectable line selection field 416, as shown in the example screen illustrated by FIG. 4C. For example, the user may select "work line" from a drop-down list or a menu. The line selection module 310 selects the communication line displayed in the line selection field 416 when the user places a call to the target recipient with which the address book entry is associated.

Figure 4D:
FIG. 4D shows a further view of the address book entry for the graphical user interface screen.

As shown in the example screen illustrated by FIG. 4D, the address book entry screen 404 includes a category field 418. For example, if the user selects the category "work", the line selection module 310 automatically selects the communication line associated with work use, for example, the first communication line. In another example, if the user enters the category "friend", the line selection module 310 selects the communication line associated with personal use, for example, the second communication line.

According to another example embodiment, the line selection module 310 selects a first communication line for use during a first time period and a second communication line for use during a second time period. For example, a user may wish to automatically use a first communication line during work hours and a second communication line after work hours and on weekends.

Figure 5A:
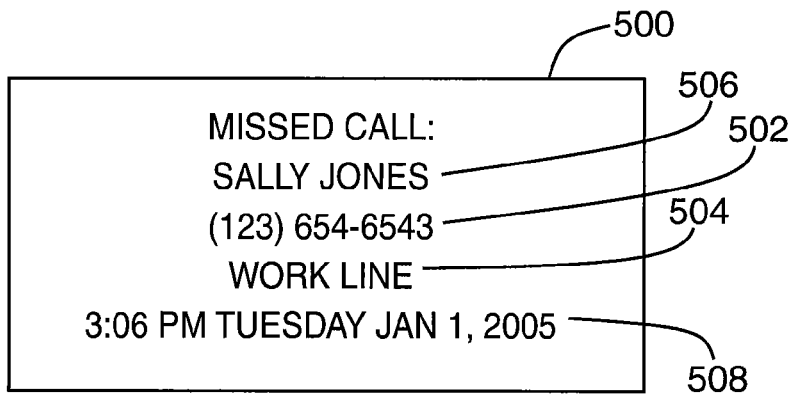
FIG. 5A shows a screen display for a missed call indicator.

According to another example embodiment, when a user misses an incoming call to the device 10 and the caller does not leave a voice mail, a missed call indicator or icon 500 may be displayed on screen 44 (FIG. 2), as shown in the example screen illustrated by FIG. 5A. The missed call indicator 500 may be displayed on the screen 44 (FIG. 2) following a user prompt using an auxiliary I/O device 28 (FIG. 1), for example, the thumbwheel 28a (FIG. 2), or the keyboard 32 (FIG. 2). It should be noted that there may be more than one missed call indicator, for example a primary indicator such as a missed call icon or an item in a list of recent activity (i.e. a call log) and a secondary indicator similar to the missed call indicator 500 which is displayed on the screen 44 (FIG. 2) following a user prompt, as discussed above.

The missed call indicator 500 may include the phone number of the missed call 502 (e.g. (123) 654-6543). The missed call indicator 500 may also display the communication line 504 on which the call was made (e.g. "work line"). If the phone number of the missed call 502 corresponds to the phone number of an individual or entity stored in the address book module 304 (FIG. 3), the missed call indicator 500 may display the name 506 (e.g. "Sally Jones") or any other information associated with the individual or entity to which the phone number corresponds. The missed call indicator 500 may also display the time and date of the missed call 508.

Figure 5B:
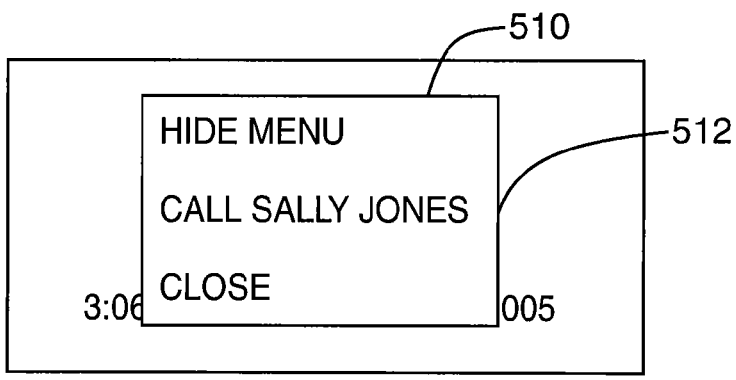
FIG. 5B shows a screen display for a menu associated with the missed call indicator of FIG. 5A.
Figure 5C:
FIG. 5C shows a screen display for another form of the missed call indicator.

The user can prompt the device 10 to display to an additional menu 510, as shown in the example screen illustrated by FIG. 5B, via the keyboard and/or an auxiliary input device such as thumbwheel 28a. The additional menu 510 comprises a plurality of selectable items, including an item 512 for calling the target recipient (e.g. "Call Sally Jones"). If the user selects the item 512, the phone module places a call to the target recipient. The line selection module 310 (FIG. 3) selects the line associated with the target recipient in the address book module 304 (FIG. 3), as described above. Alternatively, the line selection module 310 (FIG. 3) selects the same communication line that was used the last time a call was placed to that target recipient, as stored on the device 10 by the microprocessor 38 (FIG. 1). Alternatively, the line selection module 310 selects the communication line on which the missed call was received. Alternatively, the line selection module 310 may select the communication line determined to be the communication line most frequently used thus far on the device 10, as previously described. The communication line on which the call may be placed may be determined in one or more other ways, in accordance with one or more other embodiments described herein.

Figure 6A:
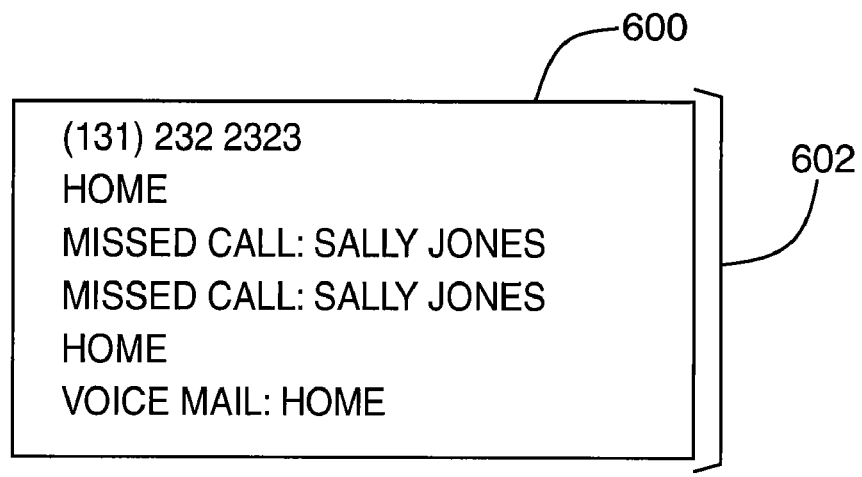
FIG. 6A shows a screen display for a call log.

According to another example embodiment, the phone module 306 (FIG. 3) comprises a call log displayed on screen 44 (FIG. 2) as a call log user interface 600 having a list 602 of recently called target recipients and/or received calls, missed calls and voice mail messages as shown in the example screen illustrated by FIG. 6A. It will be appreciated that the (primary) missed call indicator mentioned previously may be displayed as an item of the list 602.

Figure 6B:
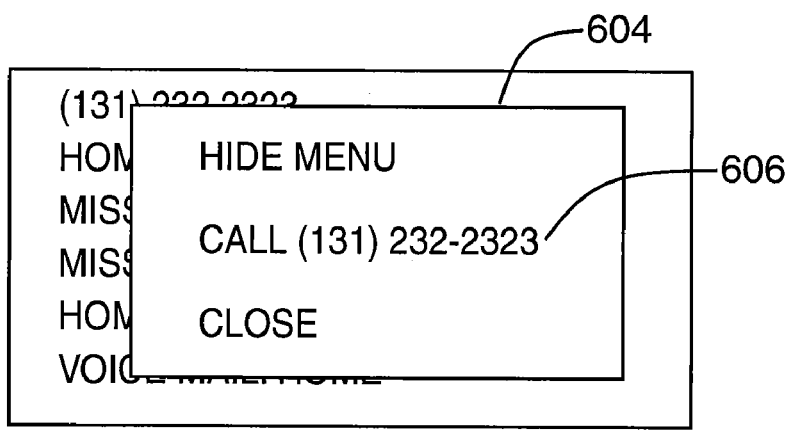
FIG. 6B shows a screen display with a menu associated with the call log.

The user may place a call to a particular target recipient of the list 602 by selecting the target recipient using the auxiliary I/O device 28 (FIG. 1), for example, the thumbwheel 28a (FIG. 2), or the keyboard 32 (FIG. 2) in conjunction with the display 22. Selection of the target recipient prompts the display of a menu 604, as shown in the example screen illustrated by FIG. 6B, via the keyboard 32 and/or an auxiliary input device 28 such as thumbwheel 28a. The menu 604 comprises a plurality of selectable items, including an item 606 for placing a call to the particular target recipient (e.g. "Call (131) 232-2323"). The line selection module 310 (FIG. 3) may select the same communication line that was used the last time a call was placed to that target recipient, as stored on the device 10 by the microprocessor 38. Alternatively, the line selection module 310 (FIG. 3) may select the communication line associated with the target recipient in the address book module 304 (FIG. 3), as described above. Alternatively, the line selection module 310 (FIG. 3) may select the communication line most frequently used thus far on the device 10, as previously described. The communication line on which the call may be placed may be determined in one or more other ways, in accordance with one or more other embodiments described herein.

Figure 7A:
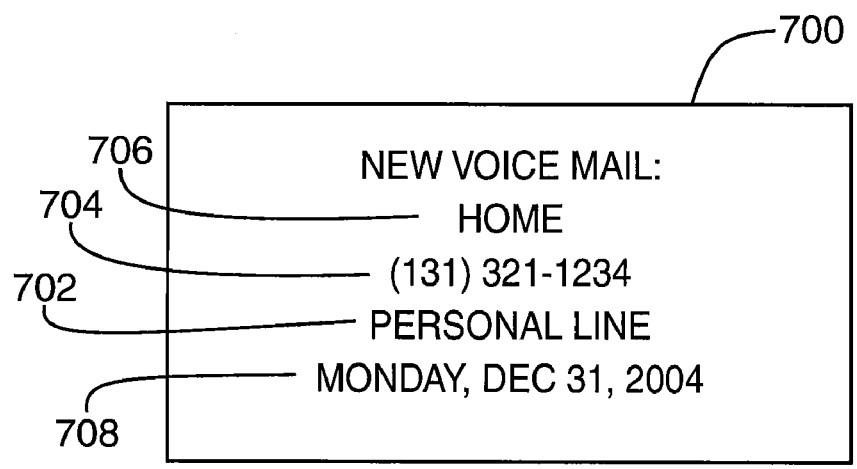
FIG. 7A shows a screen display on the graphical user interface for a new voice mail indicator.

In another example embodiment, the phone module 306 (FIG. 3) comprises a voice mail system. When a new voice mail message is stored by the phone module 306, the device 10 displays a voice mail waiting indicator 700 on screen 44, as shown in the example screen illustrated by FIG. 7A. The voice mail indicator 700 may be displayed on the screen 44 (FIG. 2) following a user prompt received using an auxiliary I/O device 28 (FIG. 1), for example, the thumbwheel 28a (FIG. 2), or the keyboard 32 (FIG. 2). It will be appreciated that there may be more than one voice mail indicator, for example, a primary indicator such as a voice mail icon or an item in a list of recent activity (e.g. a call log) and a secondary indicator similar to the voice mail waiting indicator 700 which is displayed on the display 22 (FIG. 2) following a user prompt, as discussed above.

The voice mail waiting indicator 700 may display the communication line 702 on which the call was made (e.g. "personal line") and a phone number 704 of the target recipient that left the voice mail (e.g. "(131) 321-1234"). If the phone number 704 corresponds to the phone number of an individual or entity stored in the address book module 304 (FIG. 3), the voice mail indicator 700 may also display a name 706 or any other information of the individual or entity that left the voice mail (e.g. "Home"). The voice mail indicator 700 may also display a time and date 708 for the voice mail message.

Figure 7B:
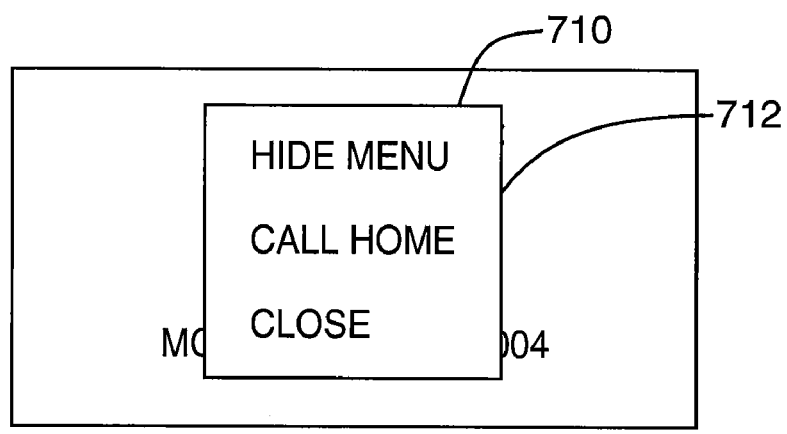
FIG. 7B shows a screen display for a menu associated with a new voice mail indicator of FIG. 7A.

The user may prompt the display of an additional menu 710, as shown in the example screen of FIG. 7B via the keyboard and/or an auxiliary input device such as thumbwheel 28a (FIG. 2). The menu 710 comprises a plurality of selectable items, including an item 712 for calling the number of the individual or entity that left the voice mail (i.e. the target recipient if called), e.g. "Call Home". The line selection module 310 (FIG. 3) selects the communication line 702 (FIG. 7A) indicated by the voice mail waiting indicator 700. Alternatively, the line selection module 310 (FIG. 3) selects the same communication line that was used the last time a call was placed to that target recipient, as stored on the device 10 by the microprocessor 38. Alternatively, the line selection module 310 (FIG. 3) selects the communication line associated with the target recipient in the address book module 304 (FIG. 3), as described above. Alternatively, the line selection module 310 (FIG. 3) may select the communication line most frequently used thus far on the device 10, as previously described. The communication line on which the call may be placed may be determined in one or more other ways, in accordance with one or more other embodiments described herein.

According to another example embodiment, the messaging module 308 (FIG. 3) provides messaging functionality. For example, when an e-mail message is opened, the screen 44 (FIG. 2) displays an e-mail message graphical user interface screen 800, as shown in the example screen illustrated by FIG. 8A. The e-mail message graphical user interface screen 800 is generated in response to the user selecting an e-mail message to be viewed or in response to other activity at device 10. It will be appreciated that the e-mail message graphical user interface screen 800 may alternatively be a screen display for an SMS message or any other type of electronic message, for example, as described above.

In one embodiment, the messaging module 308 may be configured to at least receive messages sent to any of two or more e-mail addresses associated with at least one user of device 10. Each message address may be categorized (e.g. as business, personal, etc.) and each category may be associated with a line (e.g. business line, personal line, etc.).

Figure 8A:
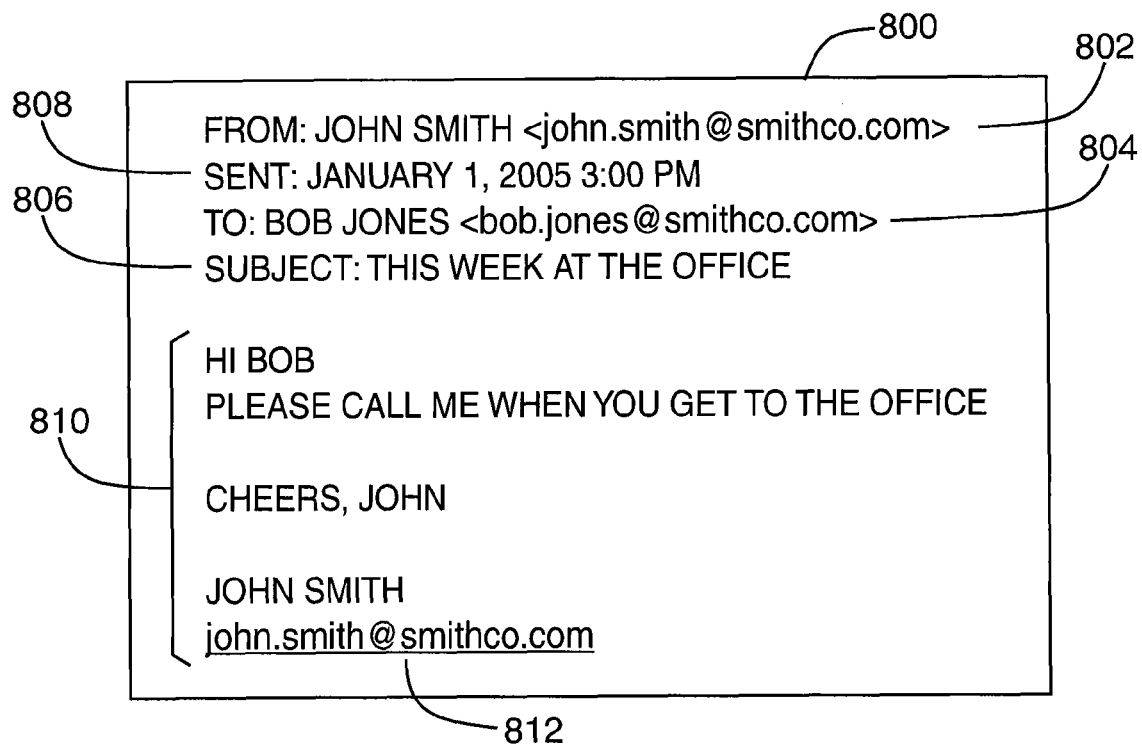
FIG. 8A shows a diagrammatic view of an electronic mail message graphical user interface screen.
Figure 8B:
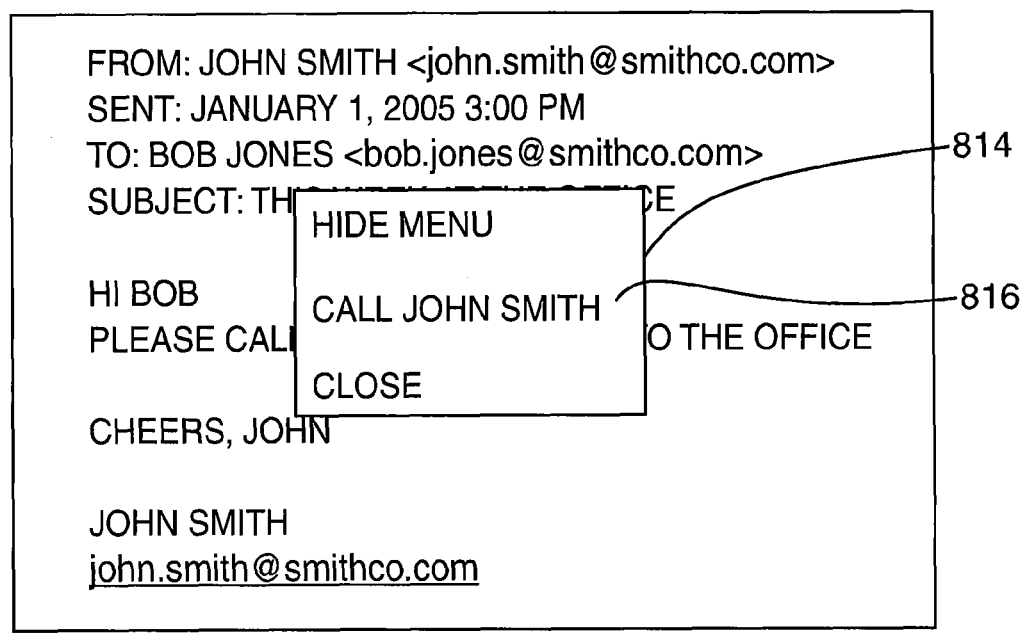
FIG. 8B shows a diagrammatic view of a menu associated with an electronic mail message.

As shown in FIG. 8A, the e-mail message graphical user interface screen 800 may comprise a sender name 802, a list of recipients 804, a subject of the message 806, a date and/or time the message was sent 808 and a message body 810. Any of these fields contained in the text of the message may comprise data associated with a potential target recipient (e.g. name, e-mail address, phone number etc.) to which an outgoing call may be placed or to which a message may be sent. For example, the message body 810 may include an e-mail hyperlink 812. The user may prompt the device 10 display to a menu 814, as shown in the example screen illustrated by FIG. 8B, via the keyboard and/or an auxiliary input device such as thumbwheel 28a (FIG. 2) by selecting the e-mail hyperlink 812. The menu 814 comprises a plurality of selectable items, including an item 816 for calling the target recipient associated with the e-mail hyperlink 812. Selection of the item 816 will prompt the phone module 306 to place a call to the target recipient associated with the e-mail hyperlink 814. The line selection module 310 (FIG. 3) may select the communication line associated with the target recipient in the address book module 304. Alternatively, the line selection module 310 (FIG. 3) may select the same communication line that was used the last time a call was placed to that target recipient, as stored on the device 10 by the microprocessor 38. Alternatively, the line selection module 310 (FIG. 3) may select the communication line most frequently used thus far on device 10. Alternatively, the line selection module 310 (FIG. 3) may select a communication line associated with the e-mail address of the user of the device at which the message was received (e.g. recipient address 804 "bob.jones@smithco.com"). As previously noted, a business e-mail address may be associated with a business line, such that when a target recipient is identified in the text of an e-mail message received at the user's business e-mail address and a call to that target recipient is initiated (e.g. by selecting the text in the message), the line selection module 310 may select the associated communication line identified by the user as the "business" line for placing the call. The communication line on which the call may be placed may be determined in one or more other ways, in accordance with one or more other embodiments described herein.

According to another example embodiment, selection of the item 816 prompts the phone module 306 (FIG. 3) to place a call to the target recipient associated with the e-mail author or sender 802. The line selection module 310 (FIG. 3) may select the communication line associated with the e-mail author or sender 802 as determined by the address book module 304 (FIG. 3). Alternatively, the line selection module 310 may select the same communication line that was used the last time a call was placed to that target recipient, as stored on the device 10 by the microprocessor 38. Alternatively, the line selection module 310 (FIG. 3) may select the communication line most frequently used thus far on device 10. Alternatively, the line selection module 310 (FIG. 3) may select a communication line associated with the e-mail address of the user of the device at which the message was received (e.g. recipient address 804 "bob.jones@smithco.com"). As previously noted, a business e-mail address may be associated with a business line, such that when an e-mail message is received at the user's business e-mail address, the line selection module 310 may select the associated communication line identified by the user as the "business" line for placing the call. The communication line on which the call may be placed may be determined in one or more other ways, in accordance with one or more other embodiments described herein.

Figure 9A:
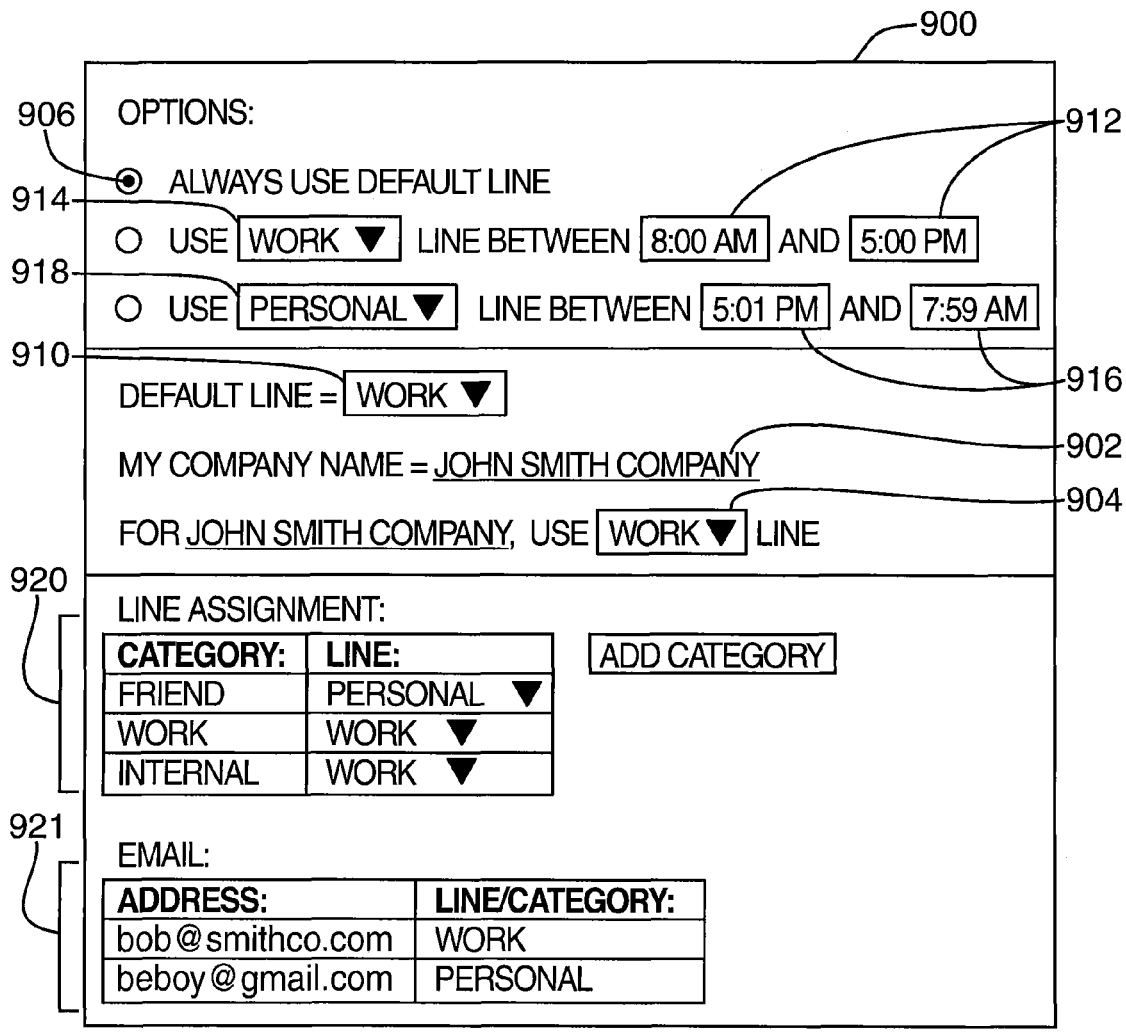
FIG. 9A shows a diagrammatic view of line selection setup graphical user interface screen.

According to another example embodiment, the user prompts the device 10 to display a line selection setup user interface screen 900 as shown in the example screen illustrated by FIG. 9A. The line selection setup screen 900 may be displayed in response to a line selection icon (not shown). The line selection setup user interface screen 900 may also be prompted via a user selectable item in a phone module user interface screen (not shown). Through the line selection setup screen 900, the user may activate or deactivate various line selection configurations, and enter other information to configure line selection functionality on device 10.

The user may enter a company name (e.g. "John Smith Company") in a field 902 in the line selection setup screen 900. The company name 902 may be stored in association with a user-selectable communication line 904 (e.g. a work line) so that whenever a phone call is made to the target recipient associated with that company, the line selection module 310 (FIG. 3) selects that selected communication line 904. This company name 902 may be the user's own company name, for example.

The line selection setup screen 900 may comprise a number of user-selectable items, such as an item 906 for selecting an option to always use a particular communication line, such as a default line 908. The line selection setup screen 900 may also include an optional function 910 for selecting which communication line to use as the default line.

The line selection setup screen 900 may also comprise an optional function for selecting a first time period 912 during which to select a first communication line 914 and a second time period 916 during which to select a second communication line 918 as described above.

The line selection setup screen 900 may include setup options or functions 920 for assigning alternate communication lines to certain categories or line selection fields, as described above with reference to FIG. 4D for example. In some embodiments, there may be other setup options or controls 921 provided allowing users to assign different communication lines to different message addresses at which messages may be received at device 10 and managed by messaging module 308 (FIG. 3).

Figure 9B:
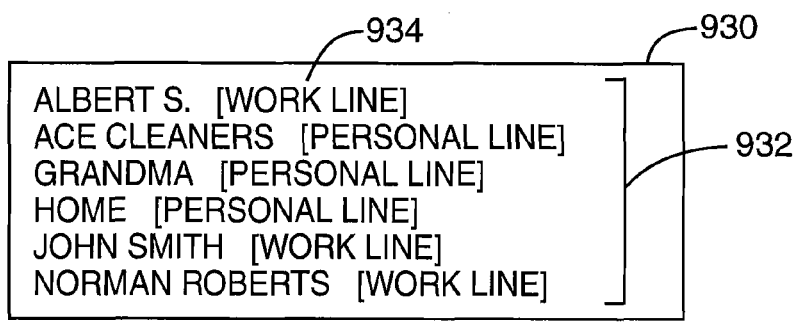
FIG. 9B shows a diagrammatic view of a phone module graphical user interface screen.

According to another example embodiment, the user prompts the device to display a user interface screen 930, as shown in the example screen illustrated by FIG. 9B, that may be similar to the graphical user interface screen for the address book list 400. This user interface screen 930 comprises a list 932 of target recipients. Each of the target recipients 932 includes a line selection indicator 934 that indicates which outgoing communication line will be selected by the line selection module 310 (FIG. 3) as described above with respect to other embodiments. The user may elect to change the selected communication line indicated by the line selection indicator 934 using suitable means for line selection, such as the line selection field 416 described previously.

According to another example embodiment, the calendar module 305 (FIG. 3) may be configured to manage appointment records stored on device 10. When an appointment record is selected, the screen 44 (FIG. 2) displays an appointment record graphical user interface screen 1000, as shown in the example screen illustrated by FIG. 10A. The appointment record graphical user interface screen 1000 may be generated in response to the user selecting an appointment record from a menu displayed to a user by calendar module 305 or in response to some other activity at device 10.

Figure 10A:
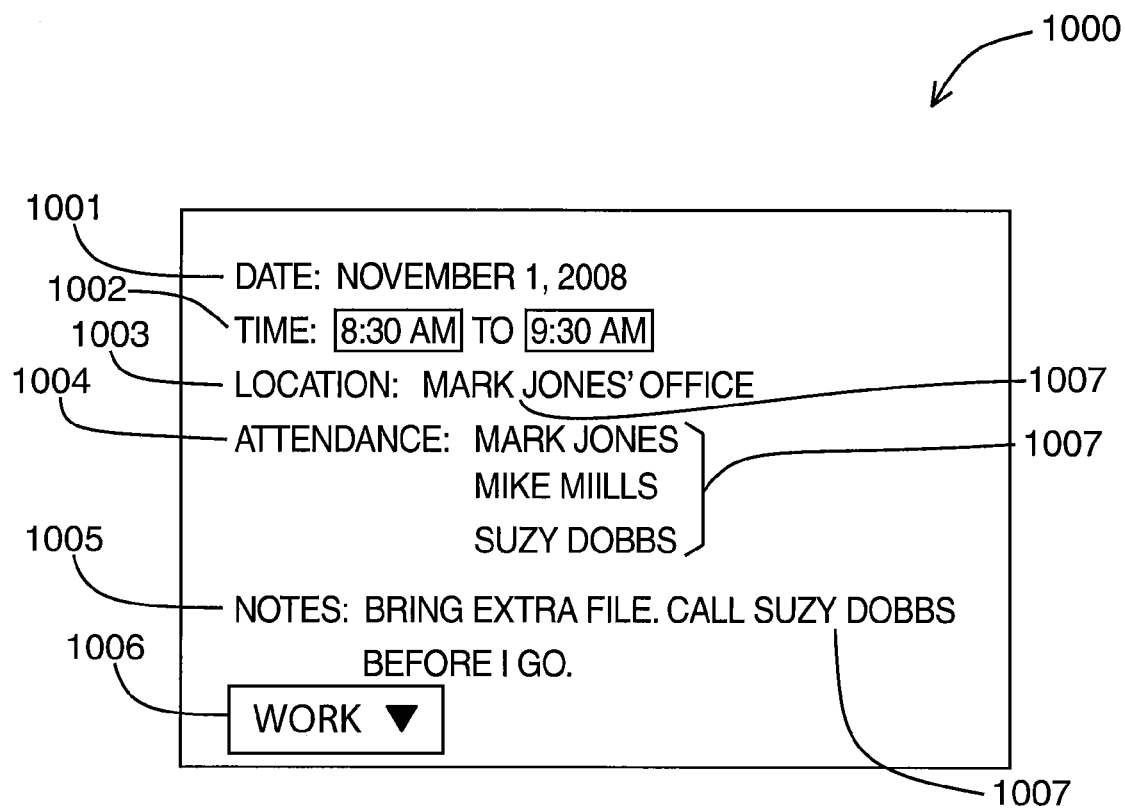
FIG. 10A shows a diagrammatic view of an appointment record graphical user interface screen.

As shown in the example of FIG. 10A, the appointment record graphical user interface screen 1000 may comprise data associated with, for example, an appointment date 1001, appointment times 1002 comprising a start time and an end time, a location 1003, an attendance list 1004, and/or notes 1005. The appointment record graphical user interface screen 1000 may comprise a category field 1006 for identifying an appointment category associated with the appointment. An appointment record may comprise data that identifies one or more potential target recipients (e.g. names 1007, e-mail addresses or other data in the notes 1005, etc.) for a call.

Figure 10B:
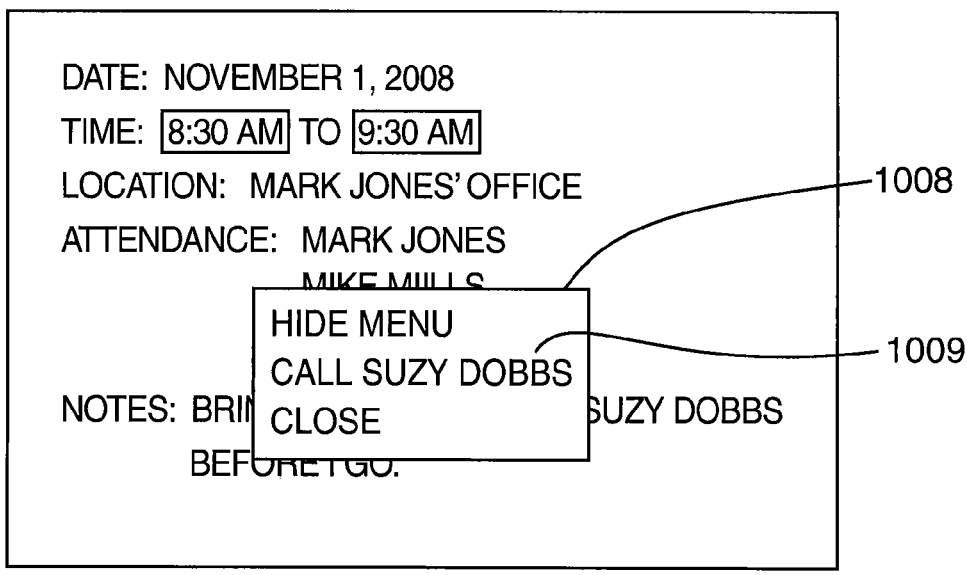
FIG. 10B shows a diagrammatic view of a menu associated with an appointment record.

The user may prompt the device 10 to display a menu 1008, as shown in the example screen illustrated by FIG. 10B, in response to a user's selection of a data item that identifies a potential target recipient for a call, via the keyboard and/or an auxiliary input device such as thumbwheel 28a (FIG. 2) for example. The menu 1008 may comprise a plurality of selectable items, including an item 1009 that may be selected by a user to initiate a call to the target recipient identified by the selected data (e.g. name 1007). Selection of the item 1009 prompts the phone module 306 to place a call to the target recipient identified by the selected data (e.g. name 1007). As previously noted, it may be necessary to associate a selected name (or selected e-mail address for example) to a phone number for the individual (i.e. the target recipient of the call to be placed) using data contained in an address book, which is managed by the address book module 304 for example, prior to initiating the call. The line selection module 310 (FIG. 3) may select the communication line associated with the appointment category 1006. Alternatively, the line selection module 310 may select the communication line associated with the target recipient in the address book module 304. Alternatively, the line selection module 310 (FIG. 3) may select the same communication line that was used the last time a call was placed to that target recipient, as stored on the device 10 by the microprocessor 38. Alternatively, the line selection module 310 (FIG. 3), may select the communication line most frequently used thus far on the device 10 as previously described. The communication line on which the call may be placed may be determined in one or more other ways, in accordance with one or more other embodiments described herein.

According to another example embodiment, the line selection module 310 may consider a combination of factors to determine a priority ranking for each of at least two communication lines accessible at the device 10. The factors may comprise one or more of the factors described previously in the present description, and may further comprise other factors. For example, the priority ranking may be determined based on a score computed from rank values associated with at least two factors selected from a group of determined factors consisting of: a communication line last used for calling the target recipient, a communication line associated with the target recipient identified in an address book, a communication line most frequently used on the device, a communication line associated with a message address, a communication line associated with a time of day, a communication line associated with an appointment record, and a default communication line. Other factors may be considered in variant embodiments. A weighting scheme may also be employed in determining the priority ranking for a particular communication line, wherein each of the various rank values of corresponding factors may be assigned a predefined weight.

For example, the communication line that was used the last time a call was placed to a target recipient may be associated with a weighting score of three, while the line most frequently used thus far on the device may be associated with a weighting score of one. As the line selection module 310 considers each factor, a cumulative tally is tracked for each communication line based on the weighting scores for the factors being considered to compute a total score for each communication line. The display module 22 may then display a listing of the communication lines, from which the user may select a communication line to place a call to the target recipient. The communication lines identified in the listing are displayed in order of their total scores (i.e. their priority ranking). The communication line for which the highest total score has been computed may be shown at the top of the menu. In variant embodiments, the communication line used to place the call to the target recipient may be automatically selected based on the priority rankings. For example, the communication line with the highest priority ranking may be automatically used to place the call without requiring the display of a listing or user selection of a line from the listing.

The weighting scheme to be employed may be flexible, and may, for instance, depend on the context of the placed call. For example, the weighting scheme to be employed when placing a call to a target recipient identified by a user-selected e-mail address in a message may be different from the weighting scheme to be employed when a call is to be placed upon selecting a target recipient from an address book.

Figure 11:
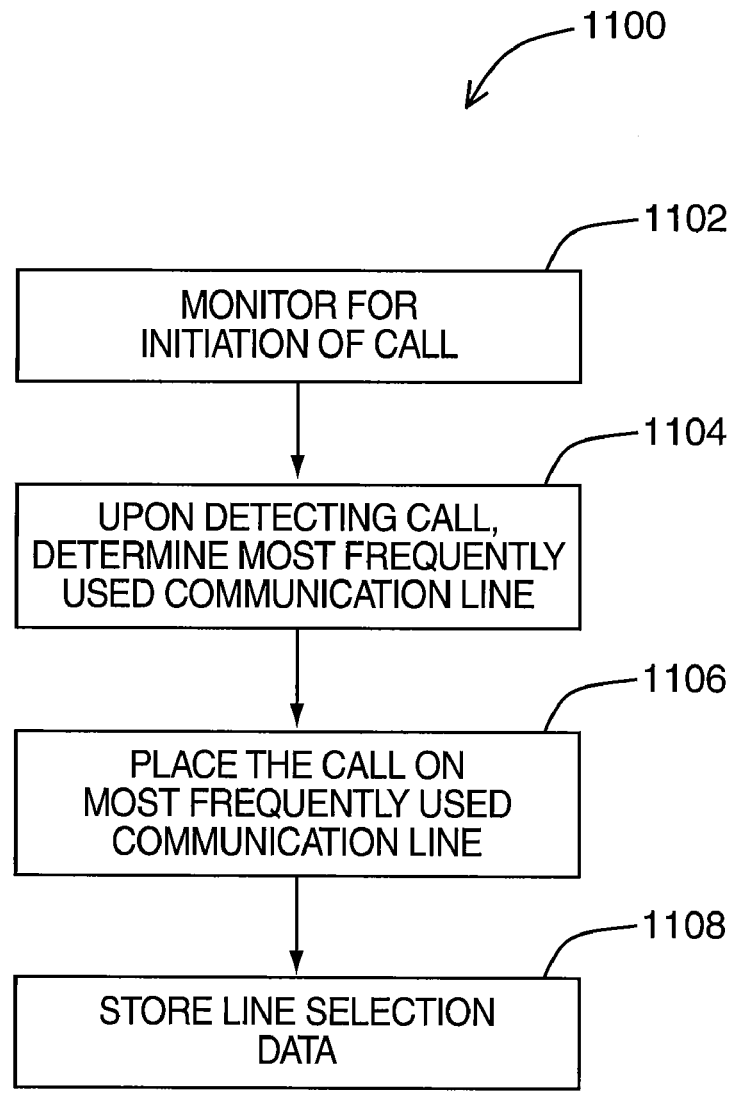
FIG. 11 is a flowchart illustrating acts performed in a method of placing a call on a communication line selected from at least two communication lines on which outgoing calls are placed using a mobile device in one example embodiment.

Reference is now made to FIG. 11, in which a flowchart illustrating acts performed in a method of placing a call on a communication line selected from at least two communication lines on which outgoing calls are placed using a mobile device in one example embodiment is shown generally as 1100. Further details of this example embodiment and related variant embodiments have been described earlier in the present description.

At 1102, the initiation of a call to a target recipient is monitored for at the mobile device. This act may be performed by an input module executed at the mobile device, for example.

Upon detecting initiation of the call to the target recipient at 1102, at 1104, a determination is made as to which of the at least two communication lines is a communication line most frequently used on the mobile device. This act may be performed by a line selection module executed at the mobile device, for example. The determination may be made only on the basis of the communication lines used to place outgoing calls using the mobile device. However, in variant embodiments, the determination may be made additionally or alternatively on the basis of the communication lines on which incoming calls are received at the mobile device. The determination may be made on the basis of calls placed and/or received within a pre-defined period of time (e.g. the last seven days, last 30 days). The determination may be made on the basis of calls placed to and/or received from any individual or entity, or on the basis of calls placed to and/or received from a particular pre-defined subset of one or more individuals or entities (i.e. target recipients and/or potential target recipients).

At 1106, the call to the target recipient is placed on the communication line of the at least two communication lines determined at 1104. This is the communication line determined to be the most frequently used on the mobile device. This act may be performed by a communication module executed at the mobile device, for example.

At 1108, line selection information comprising line selection data identifying the communication line on which the call is placed to the target recipient at 1106 is stored. This act may be performed by a line selection module executed at the mobile device, for example.

In variant embodiments, the method further comprises monitoring for the reception of a call at the mobile device, and storing the line selection information comprising line selection data identifying the communication on which the call is received at the mobile device. These acts may be performed by a phone module and/or a line selection module executed at the mobile device, for example. The stored line selection information may be used in subsequent determinations of the most frequently used communication line (e.g. at 1104).

Figure 12:
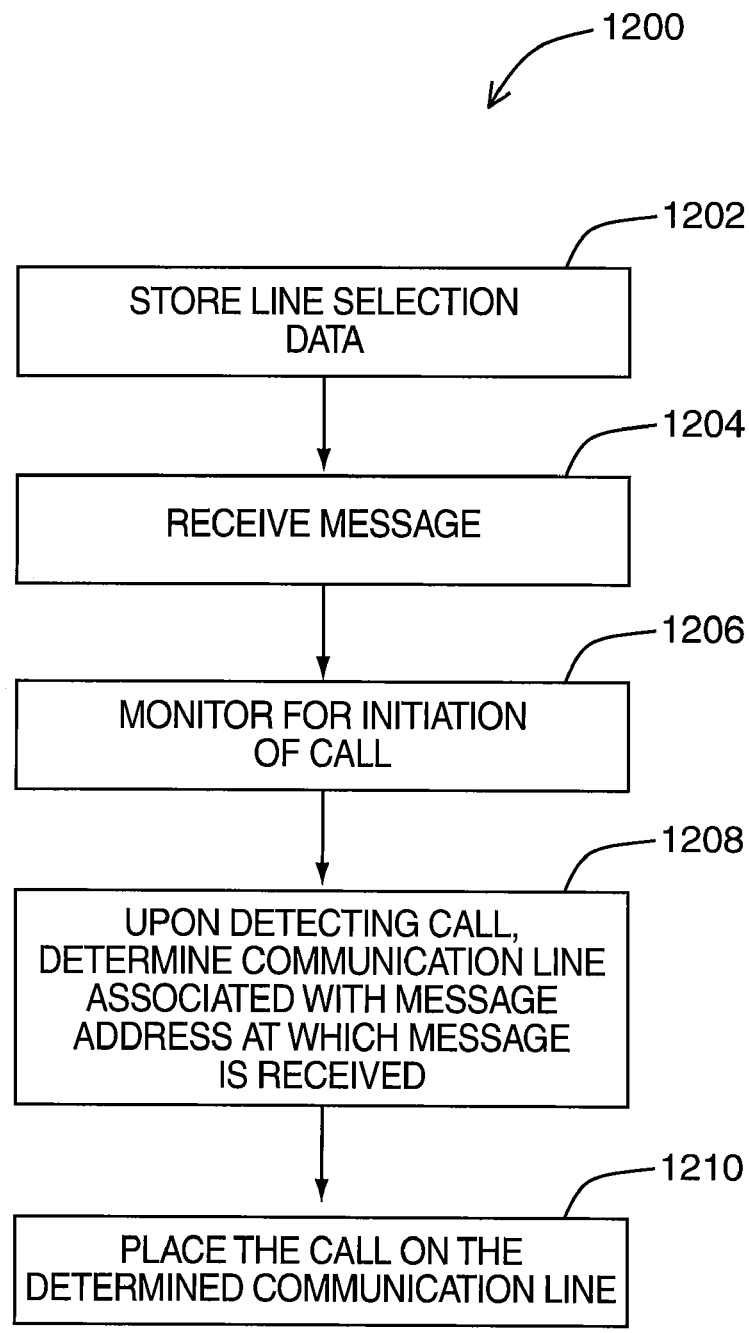
FIG. 12 is a flowchart illustrating acts performed in a method of placing a call on a communication line selected from at least two communication lines on which outgoing calls are placed using a mobile device in another example embodiment.

Reference is now made to FIG. 12, in which a flowchart illustrating acts performed in a method of placing a call on a communication line selected from at least two communication lines on which outgoing calls are placed using a mobile device in one example embodiment is shown generally as 1200. Further details of this example embodiment and related variant embodiments have been described earlier in the present description.

At 1202, line selection information comprising data identifying, for each of the two or more message addresses, which communication line of the at least two communication lines is associated therewith is stored. The stored line selection information may be used in subsequent determinations of the communication line to be used when placing a call to a target recipient identified in a message received at any of the two or more message addresses. This act may be performed by a line selection module executed at the mobile device, for example.

At 1204, a message comprising data identifying a target recipient is received at one of the two or more message addresses. The message may be processed by a messaging module executed at the mobile device, for example. The message may comprise, for example, an e-mail message, an instant message, or an SMS message. The data identifying the target recipient in the message may comprise, for example, a name, an e-mail address, or a phone number.

The messaging module, or other module, may be further programmed to detect selection of the data identifying the target recipient in the message in a user interface of the mobile device by a user, and to initiate a call to the target recipient upon selection of the data identifying the target recipient in the message.

At 1206, the initiation of a call to a target recipient is monitored for at the mobile device. This act may be performed by an input module executed at the mobile device, for example.

Upon detecting initiation of the call to the target recipient at 1206, at 1208, a determination is made as to which of the at least two communication lines is a communication line associated with the one of the two or more message addresses at which the message is received at 1204. This act may be performed by a line selection module executed at the mobile device, for example.

At 1210, the call to the target recipient is placed on the communication line of the at least two communication lines determined at 1208. This act may be performed by a communication module executed at the mobile device, for example.

Figure 13:
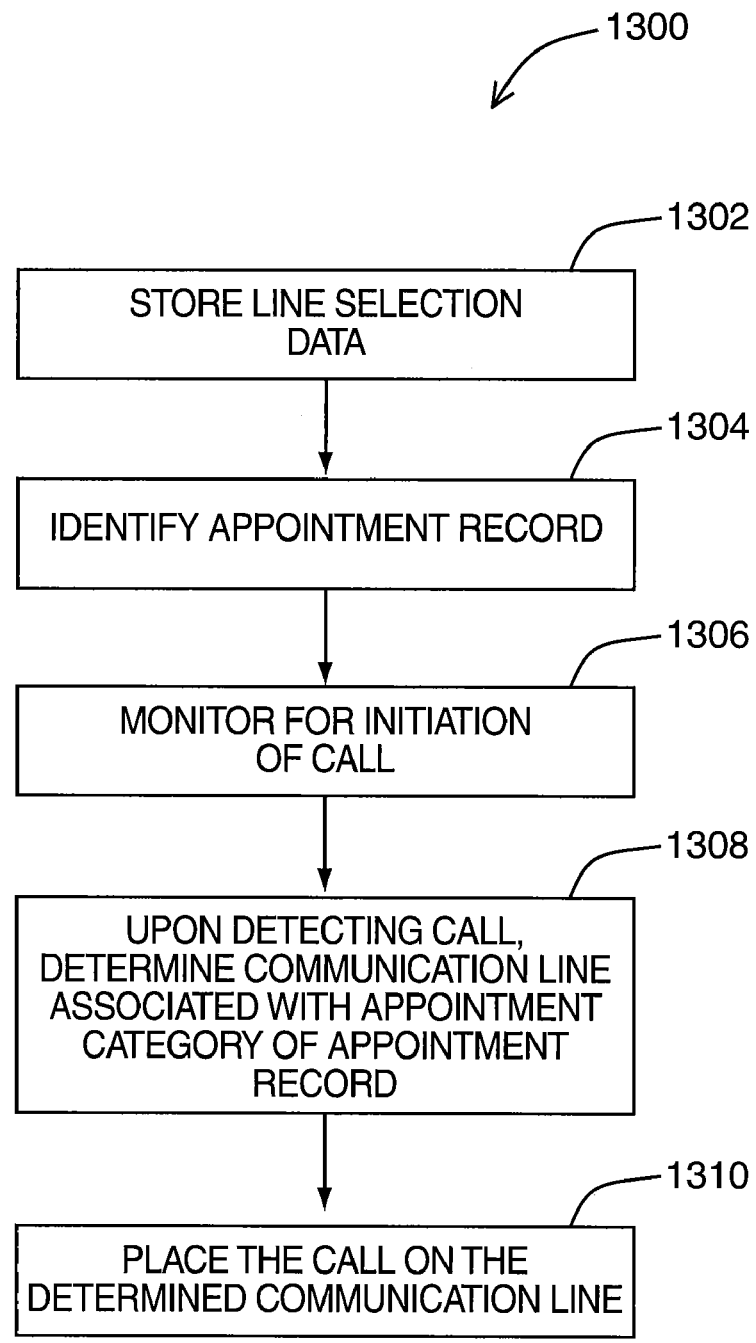
FIG. 13 is a flowchart illustrating acts performed in a method of placing a call on a communication line selected from at least two communication lines on which outgoing calls are placed using a mobile device in another example embodiment.

Reference is now made to FIG. 13, in which a flowchart illustrating acts performed in a method of placing a call on a communication line selected from at least two communication lines on which outgoing calls are placed using a mobile device in one example embodiment is shown generally as 1300. Further details of this example embodiment and related variant embodiments have been described earlier in the present description.

Although not explicitly shown in FIG. 13, a record of the appointment category with which the appointment record is associated may be stored prior to the act of identifying an appointment record, as may be selected by a user in a user interface (e.g. see category field 1006 of FIG. 10A).

At 1302, line selection information comprising data identifying, for each of the at least two appointment categories, which communication line of the at least two communication lines is associated therewith is stored. The stored line selection information may be used in subsequent determinations of the communication line to be used when placing a call to a target recipient identified in an appointment record. This act may be performed by a line selection module executed at the mobile device, for example.

At 1304, an appointment record comprising data identifying a target recipient is identified. The appointment record is associated with a selected one of at least two appointment categories, and one of the at least two communication lines is associated with the selected one of the at least two appointment categories. This act may be performed by an input module coupled to a calendar module executed at the mobile device, for example. The data identifying the target recipient in the appointment record may comprise, for example, a name, an e-mail address, or a phone number.

The calendar module, or other module, may be programmed to detect selection of the data identifying the target recipient in the appointment record in a user interface of the mobile device by a user, and to initiate a call to the target recipient upon selection of the data identifying the target recipient in the appointment record.

At 1306, the initiation of a call to a target recipient is monitored for at the mobile device. This act may be performed by an input module executed at the mobile device, for example.

Upon detecting initiation of the call to the target recipient at 1306, at 1308, a determination is made as to which of the at least two communication lines is the communication line associated with the selected one of the at least two appointment categories identified at 1304. This act may be performed by a line selection module executed at the mobile device.

At 1310, the call to the target recipient is placed on the communication line of the at least two communication lines determined at 1308. This act may be performed by a communication module executed at the mobile device, for example.

In a variant embodiment, a particular appointment record may initially not have a category associated with it, and accordingly, the user may be required to manually select a communication line on which a call is to be placed, if the call is initiated after a user selection of data identifying a target recipient provided within the particular appointment record. However, if the appointment record is associated with a recurring appointment, a category may be assigned to instances of the appointment record associated with future appointments and stored on the mobile device, based on the manually selected communication line. For example, if a business line was manually selected in order to place a call that was initiated after a user selection of data identifying a target recipient provided within the particular appointment record for a recurring appointment, instances of the appointment record associated with subsequent occurrences may be classified as "business" appointments. That category information may be stored so that the next time a call is initiated after a user selection of data identifying a target recipient provided within an appointment record in respect of that recurring appointment, the business line will be used to place that call.

Figure 14:
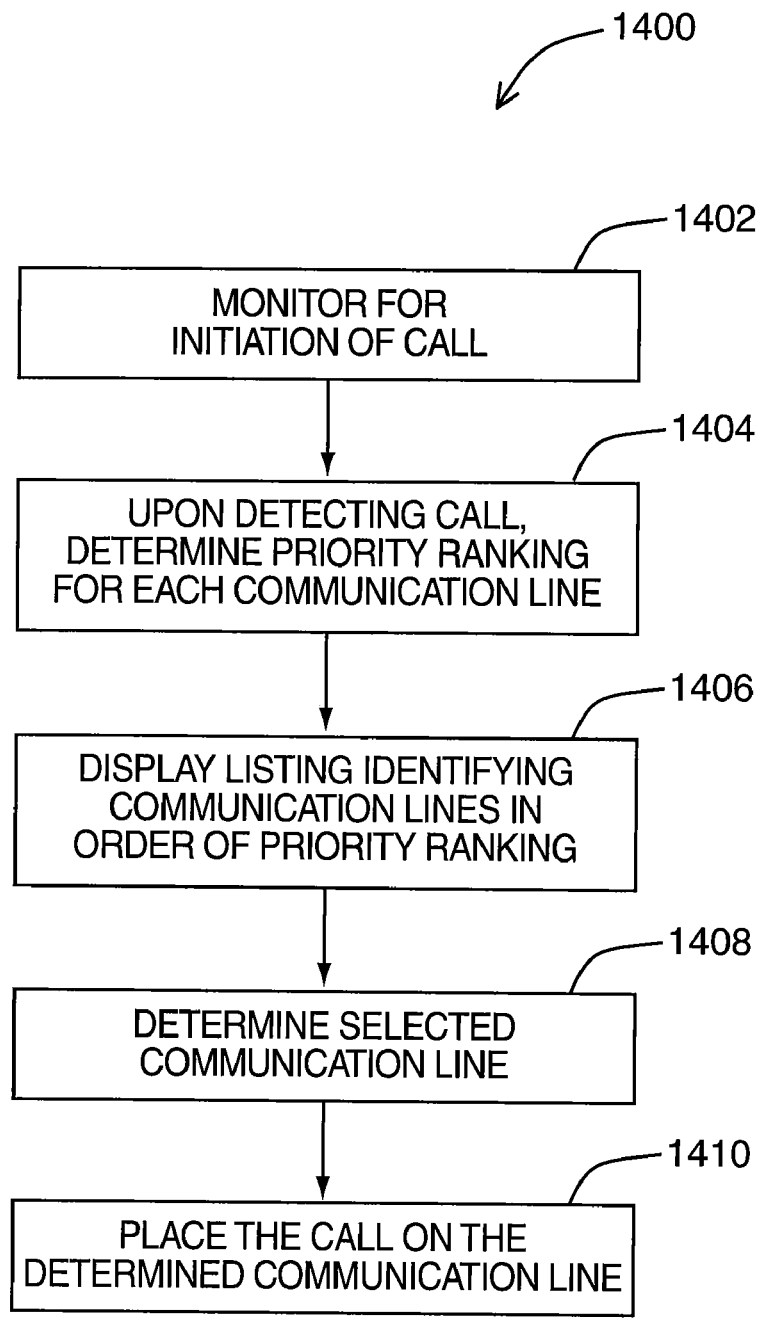
FIG. 14 is a flowchart illustrating acts performed in a method of placing a call on a communication line selected from at least two communication lines on which outgoing calls are placed using a mobile device in another example embodiment.

Reference is now made to FIG. 14, in which a flowchart illustrating acts performed in a method of placing a call on a communication line selected from at least two communication lines on which outgoing calls are placed using a mobile device in one example embodiment is shown generally as 1400. Further details of this example embodiment and related variant embodiments have been described earlier in the present description.

At 1402, the initiation of a call to a target recipient is monitored for at the mobile device. This act may be performed by an input module executed at the mobile device, for example.

Upon detecting initiation of the call to the target recipient at 1402, at 1404, a determination of a priority ranking is made for each of the at least two communication lines. This act may be performed by a line selection module executed at the mobile device. Each priority ranking may be determined based on a score computed from rank values associated with at least two factors selected from a number of factors. The rank value associated with each of the at least two factors may be determined at the time the priority ranking for the particular communication line is determined, or it may be pre-determined and updated periodically, for example. The factors for which rank values may be computed for a particular communication line may include for example, without limitation: whether the communication line was last used for calling the target recipient, whether the communication line is associated with the target recipient as identified in an address book, whether the communication line is determined to be the most frequently used communication line on the device, whether the communication line is associated with a message address of one or more messages received at the device, whether the communication line is associated with a time of day, whether the communication line is associated with an appointment record, whether the communication line is a default communication line. Different factors and/or other factors may be considered in variant embodiments. Each factor may be ordered in accordance with a priority ranking scheme, which may be pre-defined to identify which factors are to be given higher priority over others. For example, the rank values associated with the factors may be assigned weights according to a weighting scheme.

At 1406, a listing that identifies each of the at least two communication lines in order of priority rankings determined at 1404 is displayed to a user through a user interface of the mobile device. This act may be performed by a display module executed at the mobile device, for example.

At 1408, a user-selected communication line of the at least two communication lines from the listing displayed at 1406 is determined. This act may be performed by a line selection module executed at the mobile device, for example.

At 1410, the call to the target recipient is placed on the communication line of the at least two communication lines determined at 1408. This is the communication line selected by the user from the listing displayed on the mobile device at 1406. This act may be performed by a communication module executed at the mobile device, for example.

In variant embodiments, the communication line used to place the call to the target recipient may be automatically selected based on the priority rankings. For example, the communication line with the highest priority ranking may be automatically used to place the call without requiring the display of a listing (at 1406) or user selection of a line from the listing (at 1408).

It should be noted that while in the above description, a number of example embodiments have been described independently, features of multiple embodiments may also be combined. For example, if a call is placed to a target recipient associated with a particular address book entry, the line selection module 310 (FIG. 3) may select the communication line associated with that particular address book entry. If the target recipient is not associated with an address book entry, the line selection module 310 may select the line associated with the period of the day during which the call is placed.

It will also be understood that while in the above description, the entering of information, selection of items, and the like is performed using the device 10, it is equally possibly these tasks be performed using a computer, for example a desktop computer, in communication with the device 10.

It is to be appreciated that the foregoing embodiments are exemplary and do not limit their implementation to any particular computer programming language, operating system, system architecture or device architecture. Moreover, although some embodiments may include mobile devices, not all embodiments are limited to mobile devices. Various embodiments may be implemented within a variety of communications devices or terminals, including handheld devices, mobile telephones, personal digital assistants (PDAs), personal computers, audio-visual terminals, televisions, landline telephony devices and other devices.

The acts performed in respect of a method described herein in accordance with any of the embodiments described herein may be provided as executable software instructions stored on computer-readable media, which may include transmission-type media.

As used herein, the wording "and/or" is intended to represent an inclusive-or. That is, "X and/or Y" is intended to mean X or Y or both. Moreover, "X, Y, and/or Z" is intended to mean X or Y or Z or any combination thereof.

Furthermore, embodiments described herein may be implemented in other forms without departing from the spirit or essential characteristics thereof. Certain adaptations and modifications of the invention will be obvious to those skilled in the art. Therefore, the embodiments described herein are considered to be illustrative and not restrictive, the scope of the invention being indicated by the appended claims rather the foregoing description, and all changes which come within the meaning and range of equivalency of the claims are therefore intended to be embraced therein.

The invention claimed is:

1. A method of placing a telephone call on a communication line selected from at least two communication lines on which outgoing telephone calls are placed using a mobile device, said method comprising:
    associating one of the at least two communication lines with a selected one of at least two calendar appointment categories, wherein each of the at least two communication lines has a phone number associated therewith;
identifying a calendar appointment record comprising data identifying a target recipient, wherein the calendar appointment record is associated with the selected one of at least two calendar appointment categories;
monitoring for initiation of a telephone call to the target recipient;
upon detecting the initiation of the telephone call to the target recipient, determining which of the at least two communication lines is the communication line associated with the selected one of the at least two calendar appointment categories; and
placing the telephone call to the target recipient on the determined communication line of the at least two communication lines which is the communication line associated with the selected one of the at least two calendar appointment categories.

2. The method of claim 1, further comprising:
storing line selection information comprising data identifying, for each of the at least two calendar appointment categories, which communication line of the at least two communication lines is associated therewith.

3. The method of claim 1, further comprising:
storing a record of the calendar appointment category with which the calendar appointment record is associated prior to the act of identifying a calendar appointment record.

4. The method of claim 1, wherein the data identifying the target recipient in the calendar appointment record comprises at least one data item associated with the target recipient selected from a group consisting of a name, an e-mail address, and a phone number.

5. The method of claim 1, further comprising:
detecting selection of the data identifying the target recipient in the calendar appointment record in a user interface of the mobile device; and
initiating the telephone call to the target recipient upon detecting selection of the data identifying the target recipient in the calendar appointment record.

6. The method of claim 5, further comprising:
highlighting the data identifying the target recipient in the calendar appointment record as a user-selectable link in a user interface of the mobile device.

7. The method of claim 1, further comprising:
associating the data identifying the target recipient to a phone number for the target recipient, using data contained in an address book, prior to placing the telephone call to the target recipient.

8. A mobile device, wherein the mobile device provides access to at least two communication lines on which outgoing telephone calls are placed, the mobile device comprising:
an input module coupled to a calendar module, the input module programmed to associate one of the at least two communication lines with a selected one of at least two calendar appointment categories, wherein each of the at least two communication lines has a phone number associated therewith;
wherein the calendar module is programmed to identify a calendar appointment record comprising data identifying a target recipient, wherein the calendar appointment record is associated with the selected one of at least two calendar appointment categories;
the input module further programmed to monitor for initiation of a telephone call to the target recipient;
a line selection module programmed to determine, upon detecting the initiation of the telephone call to the target recipient, which of the at least two communication lines is the communication line associated with the selected one of the at least two calendar appointment categories; and
a communication module programmed to place the telephone call to the target recipient on the determined communication line of the at least two communication lines which is the communication line associated with the selected one of the at least two calendar appointment categories.

9. The device of claim 8, wherein the line selection module is further programmed to:
store line selection information comprising data identifying, for each of the at least two calendar appointment categories, which communication line of the at least two communication lines is associated therewith.

10. The device of claim 8, wherein the calendar module is further programmed to:
store a record of the calendar appointment category with which the calendar appointment record is associated prior to the act of identifying a calendar appointment record.

11. The device of claim 8, wherein the data identifying the target recipient in the calendar appointment record comprises at least one data item associated with the target recipient selected from a group consisting of a name, an e-mail address, and a phone number.

12. The device of claim 8, wherein the calendar module is further programmed to:
detect selection of the data identifying the target recipient in the calendar appointment record in a user interface of the mobile device; and
initiate the telephone call to the target recipient upon detecting selection of the data identifying the target recipient in the calendar appointment record.

13. The device of claim 8, further comprising an address book module, and wherein the communication module is further programmed to:
associate the data identifying the target recipient to a phone number for the target recipient, using data contained in an address book managed by the address book module, prior to placing the telephone call to the target recipient.

14. A non-transitory computer-readable medium upon which instructions are stored for performing, on a mobile device, a method of placing a telephone call on a communication line selected from at least two communication lines on which outgoing calls are placed using a mobile device, said method comprising:
associating one of the at least two communication lines with a selected one of at least two calendar appointment categories, wherein each of the at least two communication lines has a phone number associated therewith;
identifying a calendar appointment record comprising data identifying a target recipient, wherein the calendar appointment record is associated with the selected one of at least two calendar appointment categories;
monitoring for initiation of a telephone call to the target recipient;
upon detecting the initiation of the telephone call to the target recipient, determining which of the at least two communication lines is the communication line associated with the selected one of the at least two calendar appointment categories; and
placing the telephone call to the target recipient on the determined communication line of the at least two communication lines which is the communication line associated with the selected one of the at least two calendar appointment categories.

15. The medium of claim 14, wherein the method further comprises:

storing line selection information comprising data identifying, for each of the at least two calendar appointment categories, which communication line of the at least two communication lines is associated therewith.

16. The medium of claim 14, wherein the method further comprises:

storing a record of the calendar appointment category with which the calendar appointment record is associated prior to the act of identifying a calendar appointment record.

17. The medium of claim 14, wherein the data identifying the target recipient in the calendar appointment record comprises at least one data item associated with the target recipient selected from a group consisting of a name, an e-mail address, and a phone number.

18. The medium of claim 14, wherein the method further comprises:

detecting selection of the data identifying the target recipient in the calendar appointment record in a user interface of the mobile device; and initiating the telephone call to the target recipient upon detecting selection of the data identifying the target recipient in the calendar appointment record.

19. The medium of claim 18, wherein the method further comprises:

highlighting the data identifying the target recipient in the calendar appointment record as a user-selectable link in a user interface of the mobile device.

20. The medium of claim 14, wherein the method further comprises:

associating the data identifying the target recipient to a phone number for the target recipient, using data contained in an address book, prior to placing the telephone call to the target recipient.

* * * * *